United States Patent [19]
Szabo, Sr. et al.

[11] Patent Number: 5,848,498
[45] Date of Patent: *Dec. 15, 1998

[54] MODULAR CASKET DISPLAY SYSTEM

[75] Inventors: Lajos L. Szabo, Sr.; Lajos L. Szabo, Jr., both of Columbus, Ohio; Alton F. Doody, New Orleans, La.; Dennis J. Riga, New Albany, Ohio

[73] Assignee: Batesville Casket Company, Inc., Batesville, Ind.

[ * ] Notice: The term of this patent shall not extend beyond the expiration date of Pat. No. 5,709,052.

[21] Appl. No.: 890,958

[22] Filed: Jul. 8, 1997

Related U.S. Application Data

[63] Continuation of Ser. No. 452,073, May 26, 1995, Pat. No. 5,709,052, which is a continuation of Ser. No. 388,528, Feb. 14, 1995, Pat. No. 5,524,394, which is a division of Ser. No. 25,075, Mar. 2, 1993, Pat. No. 5,405,017.

[51] Int. Cl.$^6$ .............................. A47F 10/00; A61G 17/00
[52] U.S. Cl. ............................... 52/36.1; 52/28; 52/238.1; 52/239; 52/243; 52/582.1; 52/586.1; 27/27; 211/13.1; 211/175; 211/189; 211/202; 312/114; 312/223.5; 403/331; 403/381
[58] Field of Search ...................................... 52/36.1, 36.4, 52/582.1, 586.1, 238.1, 239, 243, 236.3, 28; 403/331, 381; 27/27, 13; 211/202; 312/114, 223.5

[56] References Cited

U.S. PATENT DOCUMENTS

| | | |
|---|---|---|
| 1,156,755 | 10/1915 | Casey . |
| 1,841,412 | 2/1932 | Leicht . |
| 2,580,334 | 12/1951 | Vanderveld . |
| 2,883,252 | 4/1959 | Fitzgerald . |
| 2,937,768 | 5/1960 | Davis . |
| 3,547,472 | 12/1970 | Ehrman . |
| 3,871,435 | 3/1975 | Lopatka . |
| 3,877,395 | 4/1975 | Sobel . |
| 3,971,477 | 7/1976 | Brunderly et al. . |
| 4,434,900 | 3/1984 | Cook . |
| 4,633,788 | 1/1987 | Robertson . |
| 4,776,472 | 10/1988 | Rosen . |
| 5,405,017 | 4/1995 | Szabo, Sr. et al. . |
| 5,524,394 | 6/1996 | Szabo, Sr. et al. . |
| 5,709,052 | 1/1998 | Szabo, Sr. et al. ...................... 52/36.1 |

OTHER PUBLICATIONS

Four photographs of a casket display in public use in the Fred Hunter Funeral Home, Hollywood, Florida, greater than one year prior to Mar. 2, 1993, the effective filing dte of Application Serial No. 08/452,073.

*Primary Examiner*—Christopher Kent
*Attorney, Agent, or Firm*—Wood, Herron & Evans, L.L.P.

[57] ABSTRACT

A casket display structure has a back wall and wing walls that are removably-attached to the back wall to form an alcove. A double-tiered display rack is mounted between the wing walls. The display structure includes a lower casket rollout rack connected to the fixed double-tiered rack by a scissors unit.

4 Claims, 8 Drawing Sheets

MODULAR CASKET DISPLAY SYSTEM

This application is a continuation of application Ser. No. 08/452,073, now U.S. Pat. No. 5,709,052, filed on May 26, 1995 as Modular Casket Display System, which is a continuation of application Ser. No. 08/388,528, now U.S. Pat. No. 5,524,394, filed Feb. 14, 1995, which is a divisional application of Ser. No. 08/025,075, now U.S. Pat. No. 5,405,017, filed Mar. 2, 1993.

BACKGROUND OF THE INVENTION

This invention relates to a modular display system for a casket selection or display room.

Among the funeral homes in the United States, the displaying of caskets is usually not thoroughly thought out. Typically, fifteen to twenty caskets are in a room and the environment surrounding the caskets is not completely and aesthetically designed to bring out all of the important features of the caskets.

The objective of the present invention has been to provide an improved display structure for supporting the caskets to be viewed, the display structure admitting of several configurations which, when properly disposed in a room, increase the number of caskets that can be displayed.

Another objective of the invention has been to improve the aesthetic environment in which the caskets are displayed.

Another objective of the invention has been to improve the profitability to the funeral director of his casket sales.

These objectives of the present invention are attained by providing a modular casket display structure which admits of multiple configurations and which can be installed very rapidly. More specifically, the invention includes back wall and side or wing walls removably-joined together so as to permit alcoves to be created and spaced around a display room. The invention contemplates a double-tiered display rack containing two vertically-spaced caskets disposed in each alcove. Each alcove is provided with tasteful signage which is easily mounted on the back wall to designate the category of casket and the casket per se as tastefully as possible. A modular soffit is mountable with four screws to the upper front corners of the wing walls. Each soffit contains a track light for creatively illuminating the caskets being displayed.

A variegated finish on all the surfaces of the alcove within which the caskets are displayed is of special, relatively neutral color, yet with pigmentation designed to bring up the colors of any casket displayed within the alcove.

The modular construction is not only suitable for forming alcoves lining the perimeter of walls of the display room, but it is also suitable for creating center-of-the-room displays of various configurations, thereby adding to the utilization of space within the display room.

Using the invention, a room that even seemed crowded when displaying fifteen to twenty caskets can be converted to a room displaying a minimum of twenty-seven to thirty caskets. The invention admits of the double stacking of the caskets while at the same time having them easily accessible, properly illuminated, and backed with a finish that is tastefully and aesthetically suitable for the conditions of selecting a casket. By providing a wider selection of caskets through proper utilization of the space provided by the present invention, the display room will be more profitable for the funeral director, for the parties selecting their caskets are more likely to find the caskets that suit them.

The invention permits the improved selection room to be installed in three to five days as contrasted to the several weeks that would be required if the room were built from scratch or "stick built." This fact, too, enhances the profitability to the funeral director for the funeral home will not be undesirable and adversely affected for an extended period of time by clutter and the noise of construction if the present invention is employed. Strikingly, the new improved display room can be installed almost over the weekend.

Another advantage of the modular construction is that it can be leased to the funeral director by the casket supplier with conventional leasing terms that permit the funeral director to own the structure at the end of the lease period while safeguarding the lessor permitting it to repossess the display elements if necessary. The improved profitability to the funeral director is such that lease payments are very likely to be able to be made out of the increased profitability that arises out of the display of the greater assortment of caskets along with the display in the most aesthetically pleasing environment.

BRIEF DESCRIPTION OF THE DRAWINGS

The several features and objectives of the present invention will become more readily apparent from the following detailed description taken in conjunction with the accompanying drawings in which.

DETAILED DESCRIPTION OF THE INVENTION

Figure 1:
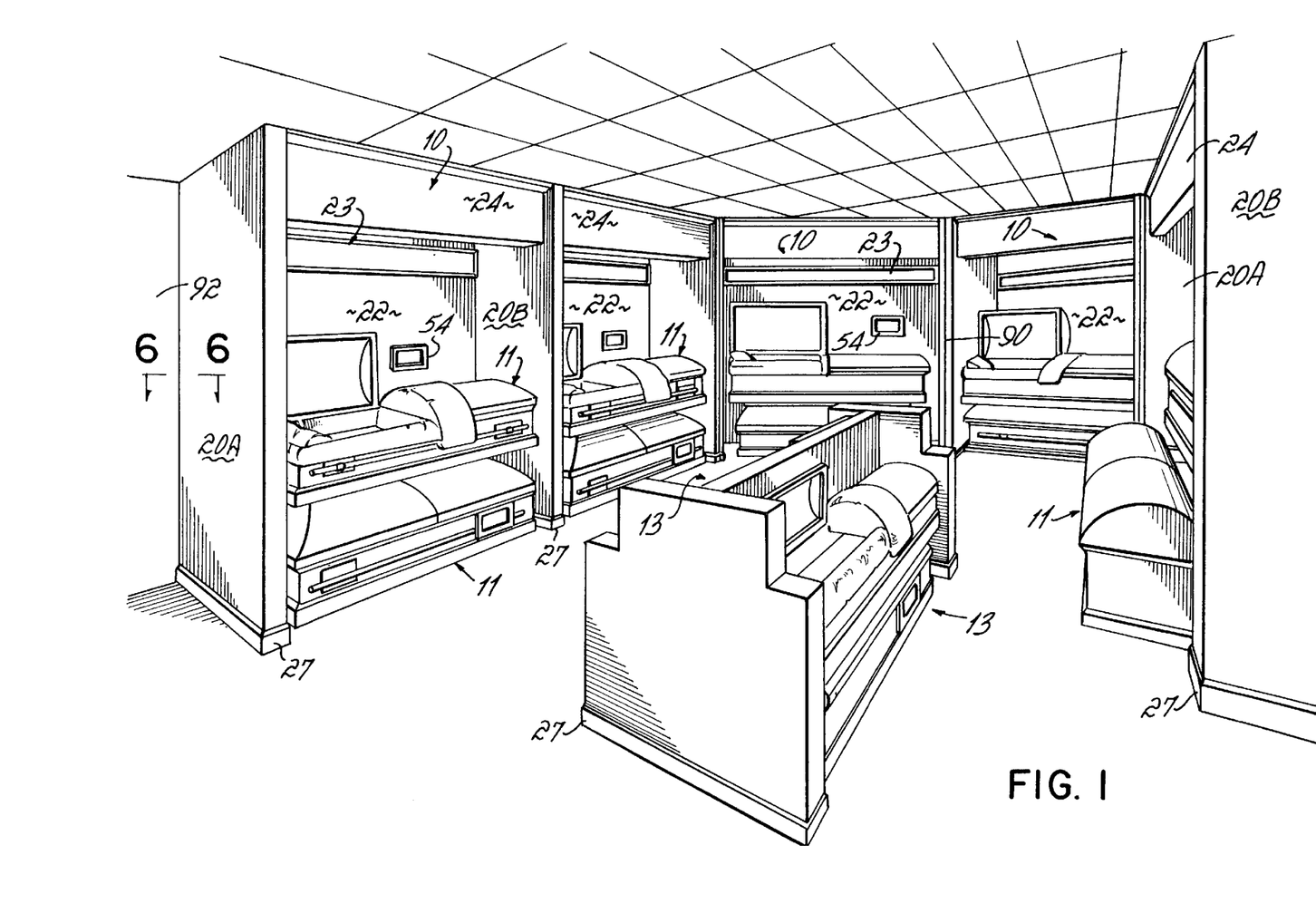
FIG. 1 is a perspective view of a casket display room utilizing the present invention.

FIG. 1 shows three walls of a representative casket display room or a funeral home, the display room having display alcoves formed in accordance with the present Invention. It is contemplated that 26 caskets can be displayed in an area of 900 square feet. The illustration in FIG. 1 is a room that is slightly greater than one-half of an exemplary room. It is to be understood that the modular construction is well suited for a wide variety of room dimensions and configurations. The partial room illustrated in FIG. 1 is exemplary.

The perimeter vertical walls are lined with alcoves 10, each alcove containing two caskets 11 on a double-tiered rack. Along the walls, the alcoves 10 are formed by wing wall structures which will be described in detail below. In the center of the room is a freestanding two-way display structure 12 creating two alcoves 13, each of which has two caskets 11 mounted on a double-tiered rack. Other freestanding configurations will be described below.

Fundamental to all of the configurations is the modular wall structure wherein the modular walls are prefabricated and are removably attached to one another to create the desired alcove configurations. Approximately 18 minutes are required to set up two alcove units. A complete casket display room can be set up in three to five days.

A representative wing wall alcove is described with reference to FIGS. 1 and the perspective view FIG. 2.

Two vertical wing walls 20A and 20B are removably secured to a back wall 21. The back wall is covered by a removable, decorative panel 22 having a sign band 23 mounted above it. A soffit or valance 24 interconnects the wing walls 20A, 20B at their upper front edges and conceals a track light 18 by which the caskets are illuminated (FIG. 3). A double-tiered, self-supporting casket display rack 25 is mounted between the two wing walls, as best shown in FIG. 2.

Each wing wall 20A, 20B is preferably provided with leveling screws 28 such as are conventionally used on refrigerators and the like so as to accommodate uneven floor situations that are encountered in the wide variety of funeral homes in which the present invention is to be utilized. Prefabricated moldings 27 are slid into place to conceal the leveling screws 28 and to provide an aesthetically-appealing joint between the lower edges of the wing walls 20A, 20B and the floor which they engage.

Figure 2:
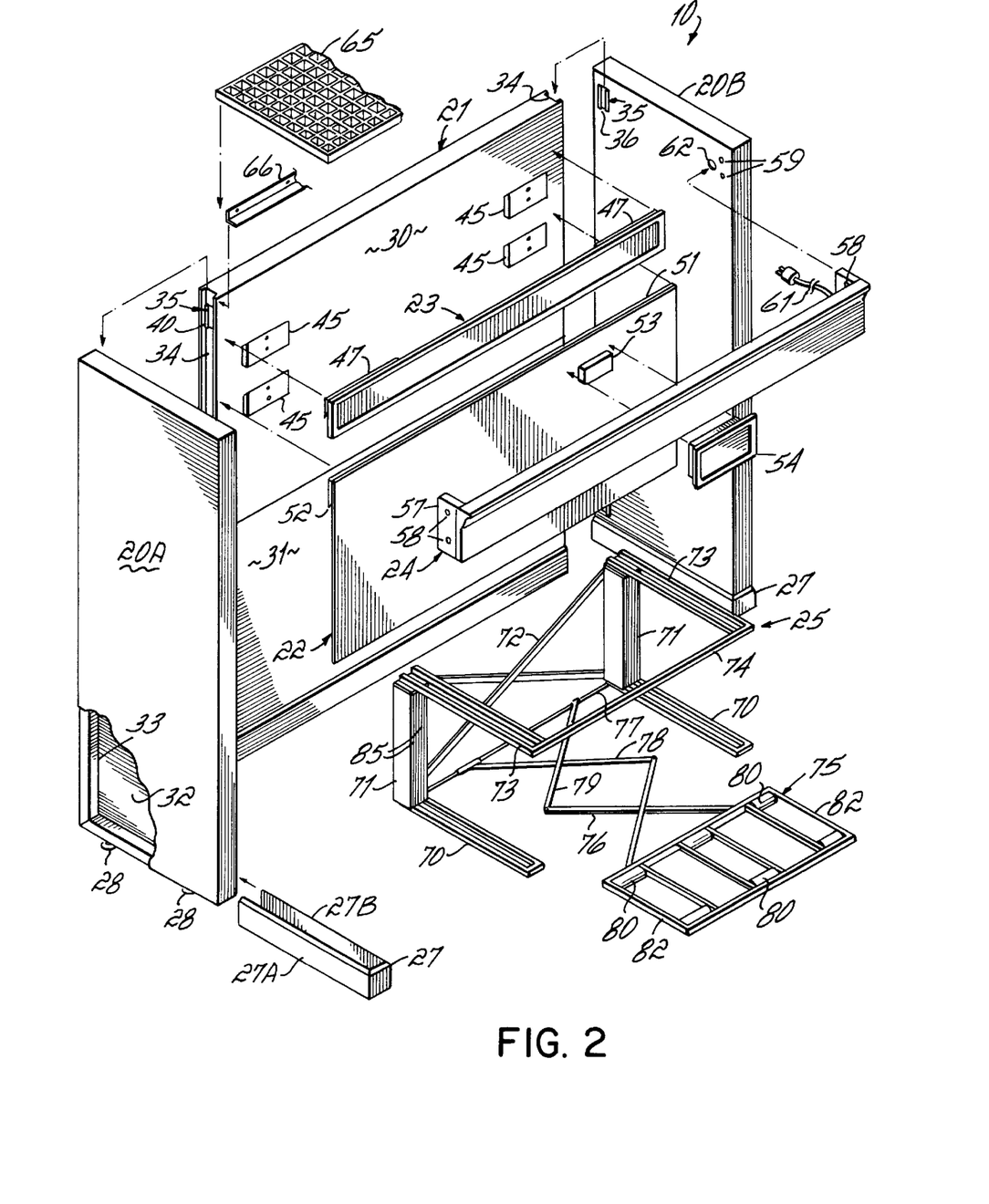
FIG. 2 is a disassembled, perspective view of one embodiment of the invention.
Figure 3:
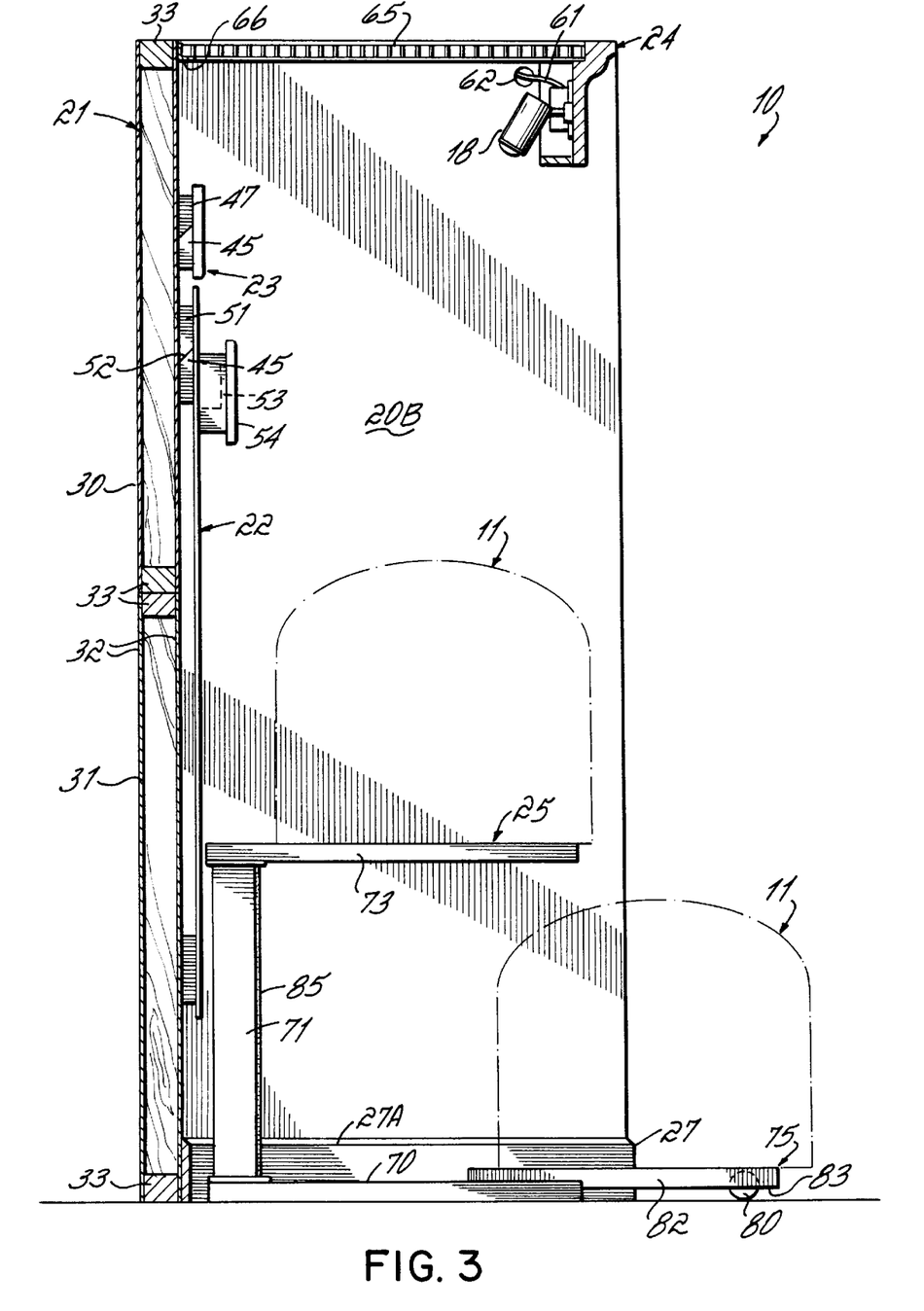
FIG. 3 is an elevational view partly in section of the embodiment of FIG. 2.
Figure 4:
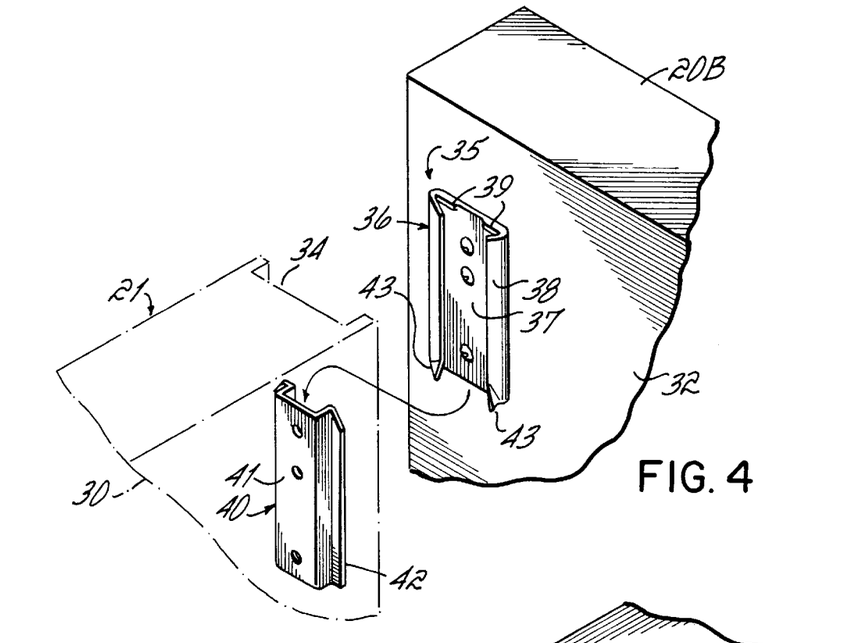
FIG. 4 is a fragmentary, perspective view of the wall fasteners for the display structure.
Figure 5:
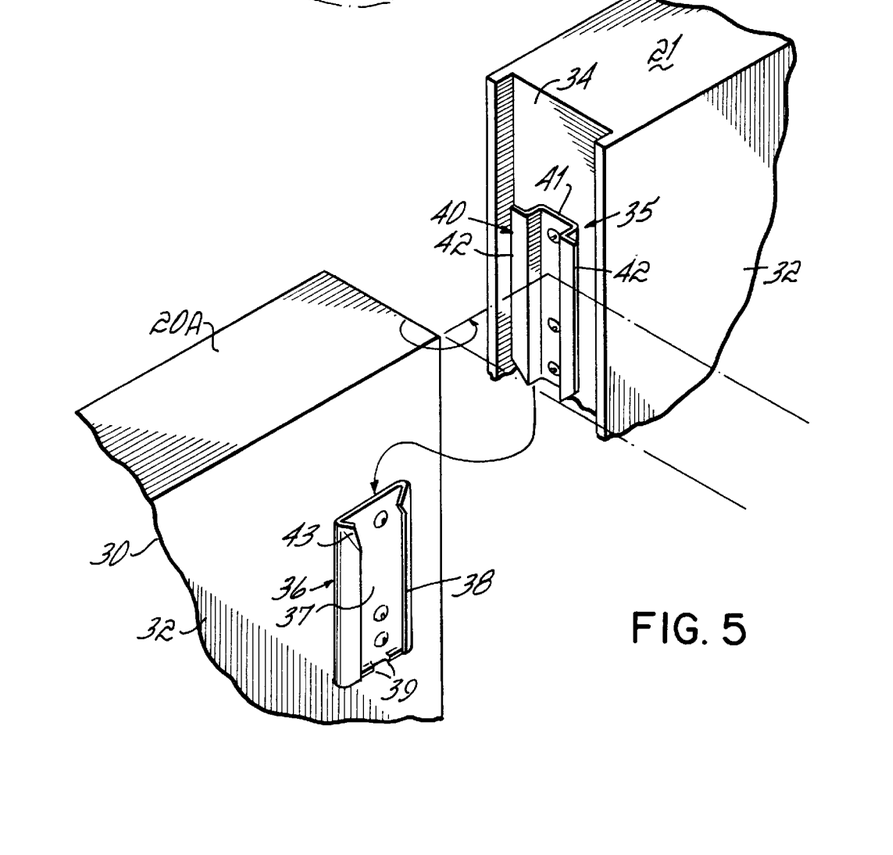
FIG. 5 is a fragmentary, perspective view of the brackets for the wall opposite to the wall depicted in FIG. 4.
Figures 6, 8:
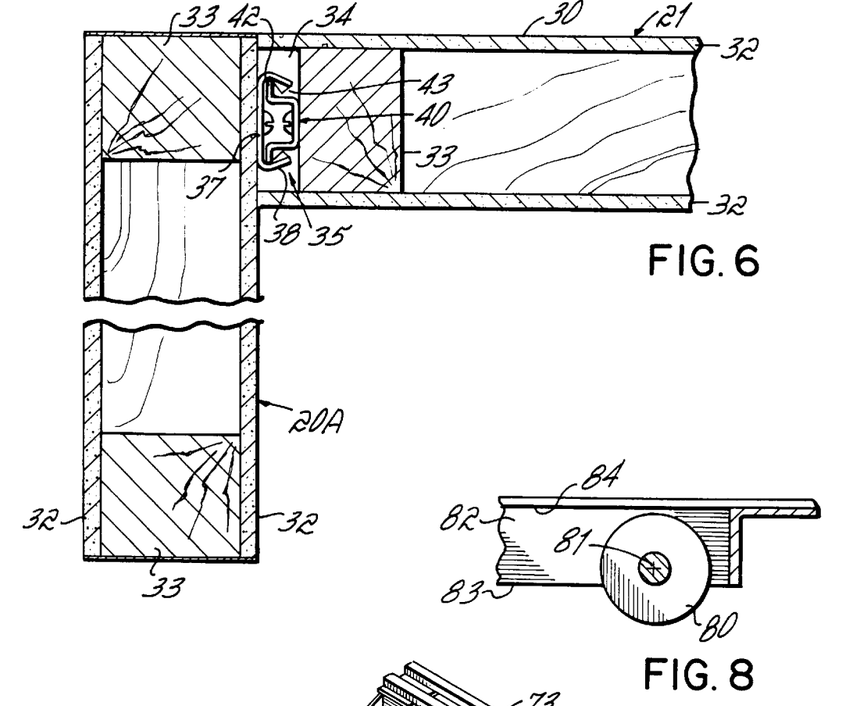
FIG. 6 is a cross-sectional view taken along lines 6—6 of FIG. 1.
FIG. 8 is a cross-sectional view taken along lines 8—8 or FIG. 7.

Referring to FIG. 2, one embodiment of a freestanding alcove is illustrated. The back wall 21 is formed of an upper section 30 and a lower section 31. As illustrated in FIG. 6 each wall section 30, 31 is hollow and is formed of ¼ inch plywood panels 32 secured around the perimeter to a wooden frame 33. The wing walls 20A, 20B are similarly formed. At the vertical edges, the wooden frame is recessed about ¾ inch deep to form a channel 34 to receive bedfitting fasteners 35 by which the wing walls 20A, 20B are joined to the back wall 21. Each joint between wing wall 20A, 20B and back wall 21 has about four vertically-spaced bedfittings 35. As shown in FIGS. 4 and 5, there is a slight difference in the orientation of the bedfittings as between the right wing wall 20B of FIG. 4 and the left wing wall 20A as depicted in FIG. 5. The right wing wall 20B has a female fitting 36 consisting of a plate 37 and integral channel-shaped vertical edges 38. An abutment 39 projects from the top of the female fitting 36. A male fitting 40 is secured by screws to the frame 33 of the back wall 21 and has a plate 41. The vertical edges of the plate 41 have laterally-projecting flanges or wings 42 which are received by the channel-shaped edges 38 of the female fitting. The channel-shaped edges 38 are, at their lower edges, slightly flared as at 43 to facilitate the entry of the male fitting 40 into the female fitting 36. As shown in FIG. 5, the bedfitting parts 36 and 40 are identical to those of FIG. 4. The female fittings 36 on the left wall 30A, however, are inverted so that the flaring 43 at the vertical edges is at the upper end of the fitting and the abutment 39 is at the lower end of the fitting.

The procedure for assembling the wing walls 20A, 20B is the back wall 21 is to first slide the vertical edge of the lower section 31 of the back wall downwardly along the rear marginal surface of the left wing wall 20A until the male fittings 40 slide into the female fittings, thus securing the vertical edge in snug abutting relation to the marginal surface of the wing wall 20A. The upper section 30 of the rear wall 21 is assembled in a similar manner (FIG. 5). Thereafter, the right wing wall 20B is assembled by sliding its marginal surface against the vertical edge of the rear wall with the female fittings 36 sliding over the male fittings 40. This assembly method creates the joints depicted in FIG. 6.

Referring again to FIG. 2, the upper section 30 of the rear wall 21 has two pairs of laterally-spaced blocks 45. The sign band 23, preferably depicting a casket category, has blocks 47 on its rear surface. The upper edges of the blocks 45 and the lower edges of the blocks 47 are beveled, thus forming mating grooves to create a French cleat (FIG. 3) by which the sign band 23 is suspended on the rear wall 21. The decorative panel 22 has a strip 51 along its upper edge, the strip 51 being beveled as at 52 on its lower edge so as to mate with the lower pair of blocks 45 to form a French cleat suspension of the panel 22 (FIG. 3). The decorative panel 22 has a block 53 mounted on it. A casket sign 54 has a hollow rectangle projecting from its rear surface. The rectangle slides over the block 53 and is screwed thereto to fasten the casket sign 54 to the panel 22.

A prefabricated soffit or valance 24 has end flanges 57. Mating screw holes 58 and 59 on the flanges 57 and wing walls 20, respectively, are used to mount the soffit 56 between the wing walls. As shown in FIG. 3, the soffit has a five-bulb track light 18. The conductive track of the track light has a flexible cable 61 which projects through a preformed hole 62 in one wing wall 20B to connect the track light to an outlet in the display room of the female home. Each assembled alcove 10 can be connected to its own outlet or, alternatively, adjoining alcoves can be serially interconnected by running cables 61 from one light bar to the light bar of the adjoining alcove soffit.

Overlying the alcove is a ceiling formed by a paracube lens 65. An angle bracket 66 is screwed to the upper marginal surface of the back wall and wing walls, leaving a projecting lower leg of the angle bracket. The paracube lens 65 is simply set into the alcove and rests upon the angle bracket.

Figure 7:
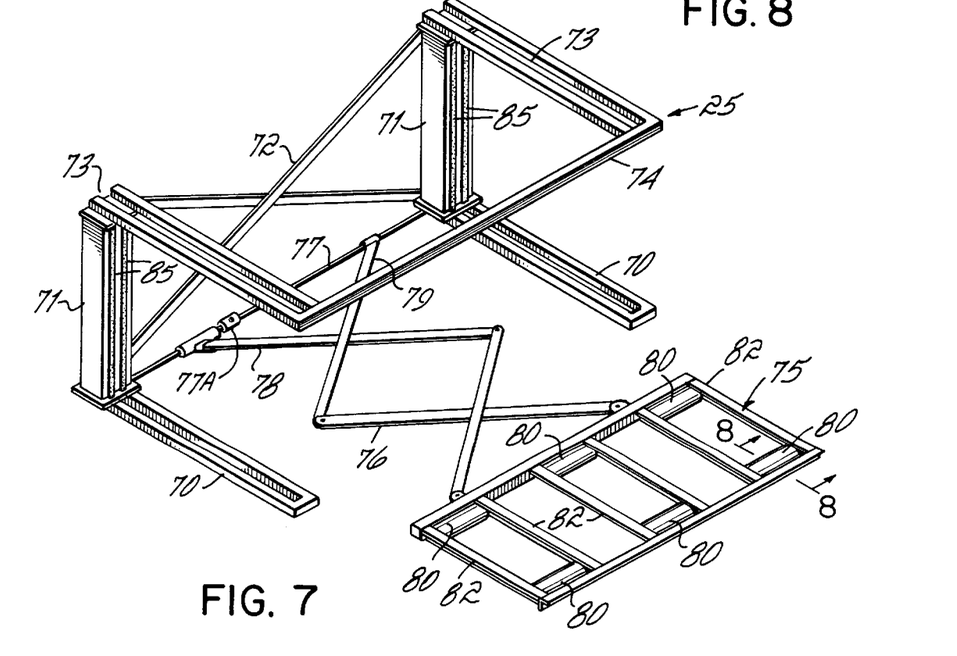
FIG. 7 is a perspective view of the double-tiered rollout casket rack.

As best shown in FIG. 7, the two-tiered casket display rack 25 has a base formed of two laterally-spaced steel rails 70 each of which is welded to a respective vertical post 71. A steel X truss 72 Interconnects the steel posts 71. Upper rails 73 are cantilevered from the upper ends of the posts 71. The front edges of the upper rails 73 are joined by a steel bar 74. The upper rails 73 and bar 74 provide a very rugged support for any casket, the caskets weighing up to about 300 pounds.

A rollout rack 75 is connected by a scissors unit 76 to a rod 77 fixed to the rear ends of lower rails 70. One leg 78 of the scissors unit is slidable on the rod 77 and the other leg 79 is fixed to the rod. The rollout rack has six rollers 80 mounted on axles 81 which are mounted between transverse bars 82 forming part of the rack 75 as best shown in FIG. 8. The transverse bars 32 have lower surfaces 83 and upper surfaces 34. The rollers 80 project slightly below the lower surface 33 and lie below the upper surface 84 so that the roller can roll along the floor of the display room and the roller is not interfered with by a casket lying on top of the rollout rack 75. The rack 25 and roller combination is designed to position the lower casket 11 a minimum distance above the floor so that upper rails 73 can be as low as possible to support the casket 11 at the lowest height possible, thereby promoting the most comfortable and least intimidating position for viewing by the persons selecting a casket.

Preferably, the front surfaces of the post 71 are lined with a rubber strip 85 to prevent the marring of the casket as it is rolled from a viewing position in front of the alcove back into the rack within the alcove to its storage position. Further, the rod 77 is preferably provided with a stop 77A that blocks the casket from being rolled out too far and yet assures that the casket will be pulled out far enough to permit lifting the casket lid without banging against the structure above.

Figure 11:
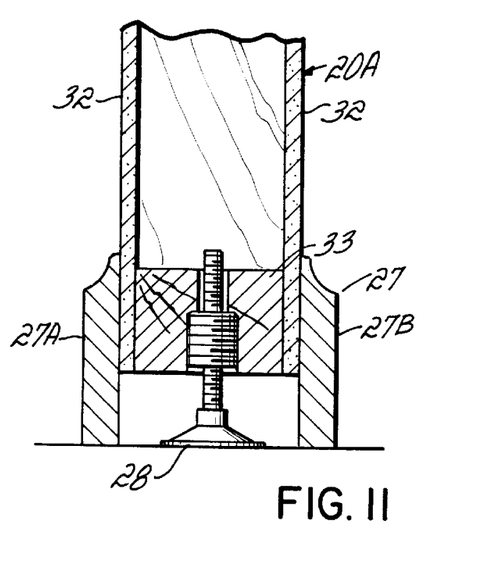
FIG. 11 is a cross-sectional view taken along lines 11—11 of FIG. 9 illustrating a typical leveler and bottom molding.

As shown in FIG. 11, each wing wall 20A, 20B (and lower back wall section if necessary) is fitted with the leveling screw 28 so that the walls can be leveled on floors that are angled to horizontal. A lower molding section 27 surrounds the lower edge of the wing wall to conceal the leveler. The molding section may be U-shaped as shown in FIG. 2 to provide molding legs 27A and 27B for the outside and inside of the alcove, respectively. It is seen that the molding 27 is simply slid around the lower edge of the wing wall. Where wing walls are mounted side-by-side as shown at 90 in FIG. 1, a J-shaped molding which eliminates one leg 27A or 27B is employed.

All exposed surfaces of the alcove are preferably coating with a variegated coating that is sprayed on the surface. A preferred coating is VARIKRON DS 31 60 848 by Roni Coating Systems, Inc. A beige liquid carries, principally, black, blue and orange beads that splatter when sprayed onto the surface to impart to the surface a neutral hue that brings out a color of the casket placed next to the finished surface.

On the category sign band 23, the category of casket is preferably designated with hot wire cut Styrofoam letters (not shown).

The value of the modular construction of a display alcove can readily be appreciated from the foregoing description of the modular elements. The representative alcove can be assembled in about 18 minutes. The rear wall 21 is assembled to the left wing wall 20A, the right wing wall 20B is then slid into place. Two screws on each side mount the soffit 24 to the upper front edges of the wing walls 20A, 20B. The sign band 23 is hung in place as is the decorative panel 50 using the French cleat mountings. The paracube ceiling 65 is dropped into place. The lower mountings are slid into place. The double-tiered rack 25 is slid into place. A complete room can be assembled in three to rive days with a labor saving of around $20,000 as contrasted to a "stick built" room.

The variegated finish provides a very pleasing setting for the caskets. The design of the double-tiered casket rack is such as to present the upper casket at a level of about 27 inches above the floor as contrasted to the prior constructions which position the casket at about 31 or 32 inches above the floor so that the casket is much less intimidating to the viewer.

Figure 9:
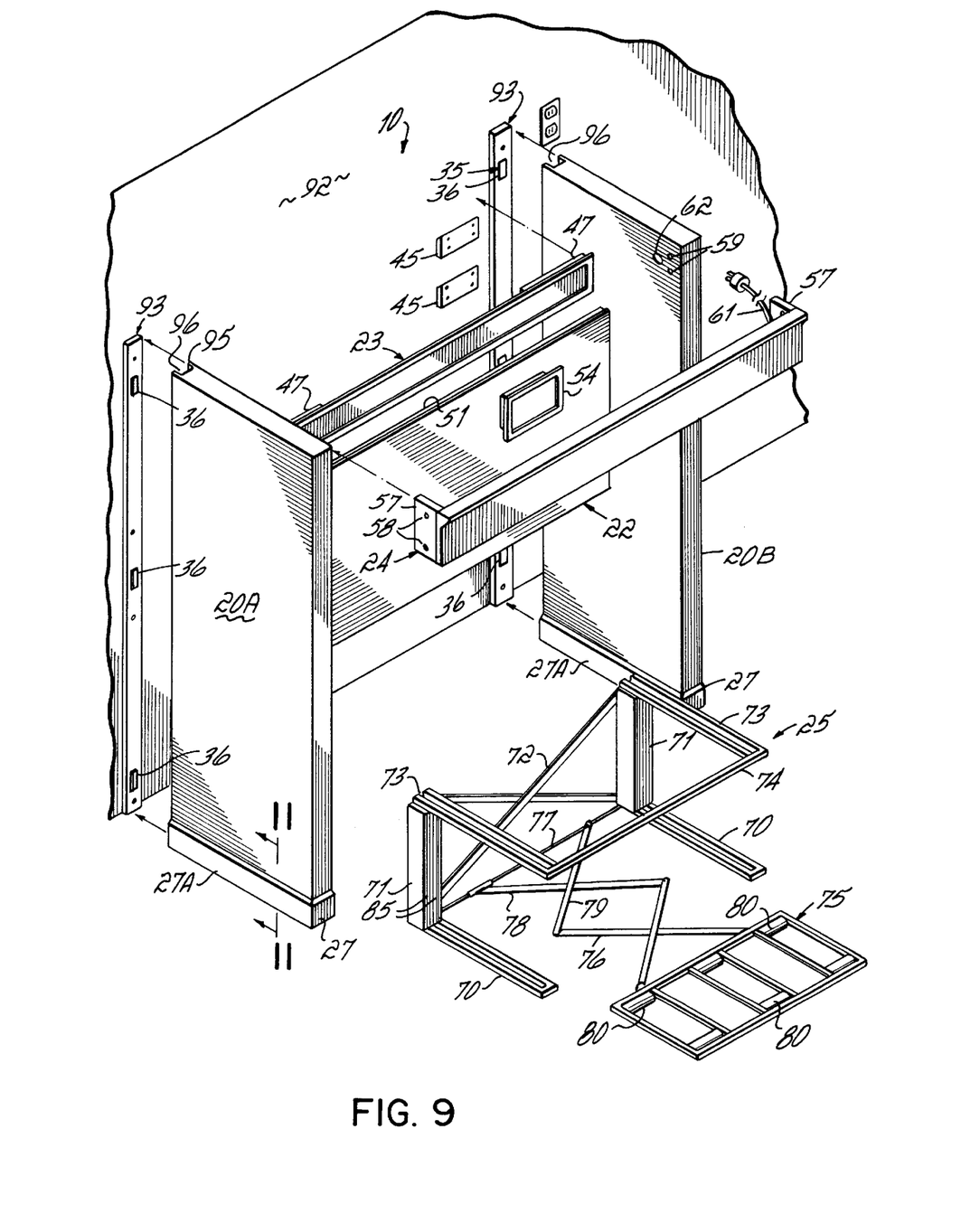
FIG. 9 is a perspective view of an alternative embodiment showing a display alcove mounted on a permanent wall.

The alcove structure just described is adapted for mounting against the wall of the display room but is nevertheless completely freestanding. In FIG. 9 there is illustrated an alcove structure designed to utilize the existing wall of the display room.

Figure 10:
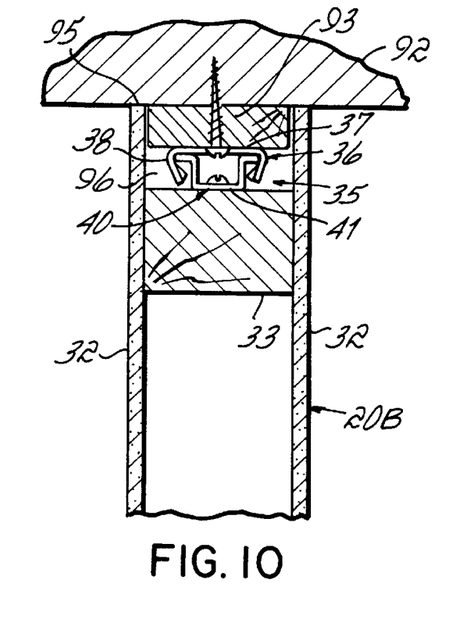
FIG. 10 is a cross-sectional view of the mounting fasteners for the wall of FIG. 9.

The existing wall is indicated at 92. Vertical wood strips 93 are screwed to the vertical wall, as are the blocks 45 which receive the sign band 23 and decorate panel 22. The wing walls 20A, 20B are specially formed with vertical rear edges 95 having recesses 96. Each recess contains three male bedfittings 40 of which only one is shown in FIG. 10 and the vertical strips have three aligned female fittings 36. The recess 96 in the rear edge of the wing walls is deep enough to accommodate the thickness of the strip 93 and female fittings as well as the thickness of the male fitting 40 so that the wing walls 20A, 20B can be assembled by sliding it down over the strip 93 so that it snugly abuts the existing wall 92. The soffit 24, paracube ceiling 65 and double-tiered rack 25 are mounted in the alcove as previously described.

Four freestanding display units suitable for the center of the display room are illustrated in FIGS. 12A to 12D.

Figure 12A:
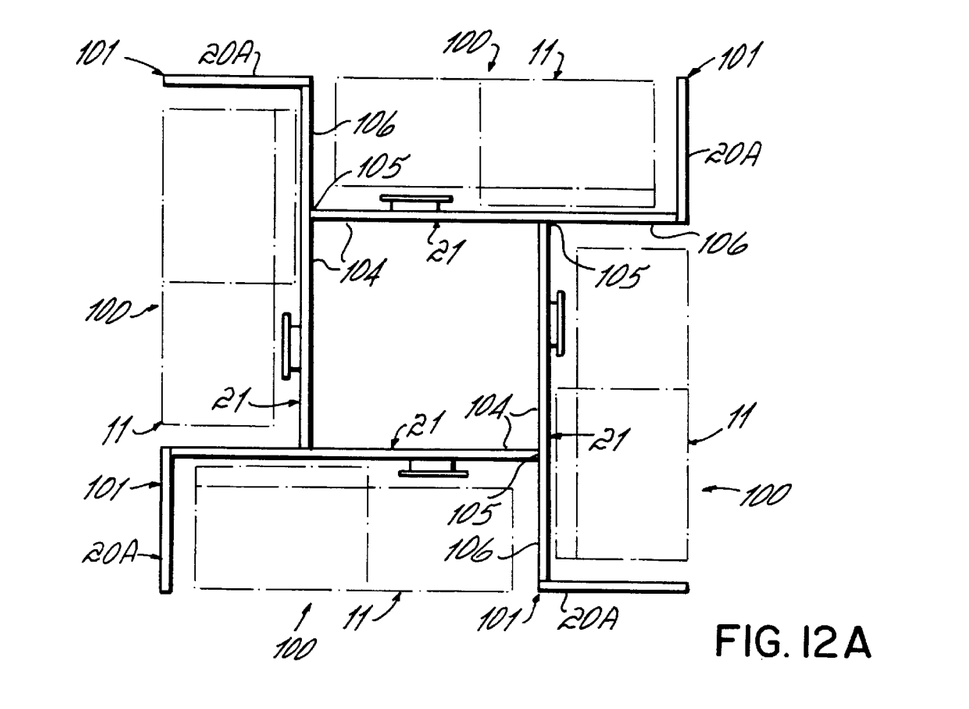
FIG. 12A is a diagrammatic plan view of an alternative freestanding four-way display.

Referring to FIG. 12A, four alcoves are formed by four L-shaped wall structures 101. Each L-shaped wail structure consists of a wing wall 20A and a back wall 21 formed as described in connection with FIG. 2. The right wing wall is omitted, however. Each back wall 21 has a rear surface 104 equipped with female bedfittings that are alignable with and receive male bedfittings on the abutting edges 105 of the rear wall 21. A visible portion 106 of the rear surface of rear wall 21 forms a wing wall of each alcove 100. It is contemplated that double-tiered racks will be positionable in each of the alcoves 100.

Figure 12B:
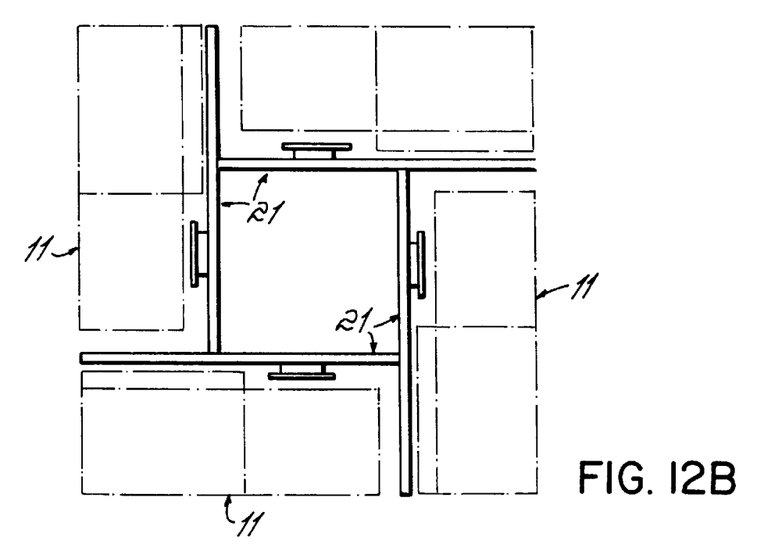
FIG. 12B is a diagrammatic plan view of an alternative four-way display.

In the alternative construction of FIG. 12B, only rear walls 21 are employed, the rear walls being interconnected by bedfittings as described in connection with FIG. 12A. The difference between the structure of FIG. 12A and FIG. 12B is that the wing wall 20 as a separate unit is eliminated, thus exposing the ends of the caskets mounted in the partial alcove for viewing.

Figure 12C:
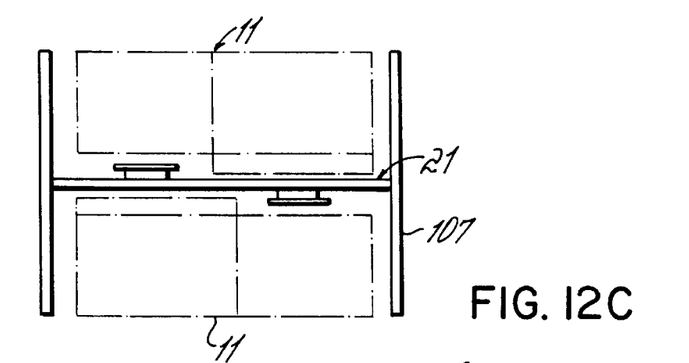
FIG. 12C is a diagrammatic plan view of an alternative two-way display.

In FIG. 12C, a rear wall 21 is butted against double-sized wing walls 107, the connection of the wing walls 107 to the rear wall 21 being made by the bedfittings as described previously.

Figure 12D:
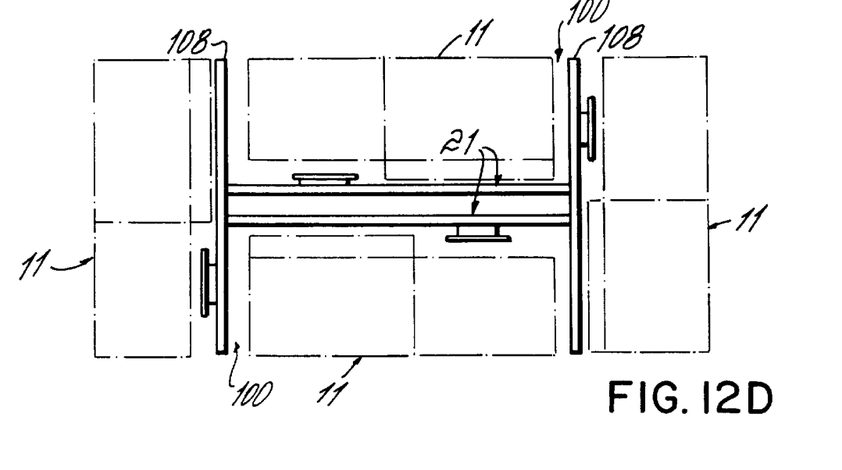
FIG. 12D is a plan view of an alternative four-way display.

The display alcove of FIG. 12D is similar to that of FIG. 12C. Two back walls 21 are provided and are butted into wing walls 108 that are even larger than the wing walls 107. The wing walls 108 are large enough from back walls for lateral caskets 11 at the sides of the display. In this form, two interior alcoves 100 are provided, each receiving two caskets on a double-tiered rack. At the sides, two caskets on a double-tiered rack can be displayed and backed by the oversized wing walls 108.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. A casket display comprising:

two vertical, parallel, spaced wing walls having vertical rear and front edges;

a vertical back wall spanning between said rear edges of said wing walls;

a two-tiered rack for supporting an upper and a lower casket, said rack being mounted between said wing walls;

an elongated, horizontal soffit mounted to said front edges of said wing walls; and a light mounted to said soffit.

2. A casket display structure comprising:

two vertical, parallel, spaced wing walls having rear vertical edges, a vertical back wall having lateral edges secured to said rear vertical edges of said wing walls, a dual casket support disposed between said wing walls, said casket support including a floor-engaging base, a vertical rear section fixed to said base, horizontal upper casket rails fixed to said rear section, and a rollout lower casket rack.

3. A casket display structure comprising:

two vertical, parallel, spaced wing walls having rear vertical edges, a vertical back wall having lateral edges secured to said rear vertical edges of said wing walls, a dual casket support disposed between said wing walls, said casket support including a floor-engaging base, a vertical rear section fixed to said base, horizontal upper casket rails fixed to said rear section, and a rollout lower casket rack, a lower back panel having an upper edge at about the level of said upper casket rails, a narrow upper panel mounted at the top of said wing walls, a middle panel extending between said lower and upper panels, and a changeable decorative panel removably mounted on and substantially coextensive with said middle panel.

4. A casket display structure comprising:

two vertical, parallel, spaced wing walls having rear vertical edges, a vertical back wall having lateral edges secured to said rear vertical edges of said wing walls, a dual casket support disposed between said wing walls, said casket support including a floor-engaging base, a vertical rear section fixed to said base, horizontal upper casket rails fixed to said rear section, and a rollout lower casket rack, levelers mounted on the bottom edges of said wing walls, and U-shaped molding units slidably-mounted around the lower edges of said wing walls.

* * * * *

UNITED STATES PATENT AND TRADEMARK OFFICE
CERTIFICATE OF CORRECTION

PATENT NO. : 5,848,498
DATED : December 15, 1998
INVENTOR(S) : Lajos L. Szabo, Sr., Lajos L. Szabo, Jr., Alton F. Doody and Dennis J. Riga It is certified that error appears in the above-indentified patent and that said Letters Patent is hereby corrected as shown below:

Column 2, line 43, "or" should read -- of --.

Column 2, line 65, "or" should read -- of --.

Column 3, line 67, "30A" should read -- 20A --.

Column 4, line 4, "is" should read -- to --.

Column 4, line 65, "bars 32" should read -- bars 82 --.

Column 4, line 67, "surface 33" should read -- surface 83 --.

Column 5, line 53, "rive" should read -- five --.

Column 6, line 3, "decorate" should read -- decorative --.

Column 6, line 18, "wail" should read -- wall --.

Signed and Sealed this

Thirty-first Day of August, 1999

Attest:

Q. TODD DICKINSON

*Attesting Officer*　　　*Acting Commissioner of Patents and Trademarks*